United States Patent
Lachish et al.

[11] Patent Number: 6,014,761
[45] Date of Patent: Jan. 11, 2000

[54] CONVOLUTIONAL INTERLEAVING/DE-INTERLEAVING METHOD USING POINTER INCREMENTING ACROSS PREDETERMINED DISTANCES AND APPARATUS FOR DATA TRANSMISSION

[75] Inventors: Oded Lachish, Tel Aviv; Ron Eliyahu, Herzlia; Marc Neustadter, Jerusalem, all of Israel

[73] Assignee: Motorola, Inc., Schaumburg, Ill.

[21] Appl. No.: 08/944,699

[22] Filed: Oct. 6, 1997

[51] Int. Cl.[7] .................................................. G06F 11/00
[52] U.S. Cl. ............................................ 714/702; 714/788
[58] Field of Search .................................. 714/702, 788; 370/474; 711/154; 365/73; 375/200

[56] References Cited

U.S. PATENT DOCUMENTS

| | | | |
|---|---|---|---|
| 4,547,887 | 10/1985 | Mui | 375/200 |
| 5,309,450 | 5/1994 | Kim | 714/762 |
| 5,535,220 | 7/1996 | Kanno et al. | 714/701 |
| 5,537,420 | 7/1996 | Huang | 714/702 |
| 5,592,492 | 1/1997 | Ben-Efraim et al. | 714/702 |
| 5,636,224 | 6/1997 | Voith et al. | 714/701 |
| 5,732,011 | 3/1998 | Schmidt | 365/73 |
| 5,745,497 | 4/1998 | Ben-Efraim et al. | 711/154 |
| 5,771,239 | 6/1998 | Moroney et al. | 370/474 |
| 5,886,998 | 3/1999 | Voith et al. | 714/702 |

OTHER PUBLICATIONS

B. Sklar "Digital Communications Fundamentals and Applications", Prentice Hall Englewood Cliffs, New Jersey 07632, pp. 357–364.

*Primary Examiner*—Albert De Cady
*Assistant Examiner*—David Ton

[57] ABSTRACT

In an (de)-interleaver (201) for J long subsequences (640–646) of data units (612), FIFOs are mapped into a memory (245) in such a way that locations (240) needed for one FIFO are moving through the memory (245). A generator (208) modulo increments only a single pointer (p, 230) which activates memory locations (240-p). Thereby, increments Δj correspond to FIFO sizes. For some p, (de)-interleaver (201) reads (25) a data unit (612) from a location (240) and than writes a new data unit (612) into that location (240), thus saving set-up times to establish a pointer. Also, the (de)-interleaver (201) needs only a number of memory locations K=(D–1) corresponding to a (D–1) interleaving depth. The (de)-interleaver (201) as part of a system (200) is fully programmable and can transfer data in two directions. Also, (de-) interleaving parameters (D–1) and J can be reconfigured during data transmission.

18 Claims, 8 Drawing Sheets

CONVOLUTIONAL INTERLEAVING/DE-INTERLEAVING METHOD USING POINTER INCREMENTING ACROSS PREDETERMINED DISTANCES AND APPARATUS FOR DATA TRANSMISSION

FIELD OF THE INVENTION

The present invention generally relates to the art of electronic data transmission, and more specifically to a method and apparatus for convolutional interleaving and de-interleaving of data for correcting bursts of errors in transmitted data.

BACKGROUND OF THE INVENTION

In many applications of communication technology, interleaving is used in combination with encoding for error correction. One technique, which is applicable to some types of burst-error communications channels, is to insert an interleaver between the channel encoder at the transmitting end of the channel. The interleaver redistributes the data bits or symbols ("data units X (i)") being transmitted over the channel so that the symbols are mutually separated by substantially more than the length of a "typical" burst of errors.

Interleaving makes the channel appear like a random-error channel to a decoder at the receiving end. For some high frequency, this technique can improve the performance by one to three orders of magnitude.

The present invention provides an improved method and apparatus for accomplishing this while mitigating some or all of the problems which are well known in the prior art

DETAILED DESCRIPTION OF THE PRESENT INVENTION

Figure 1:
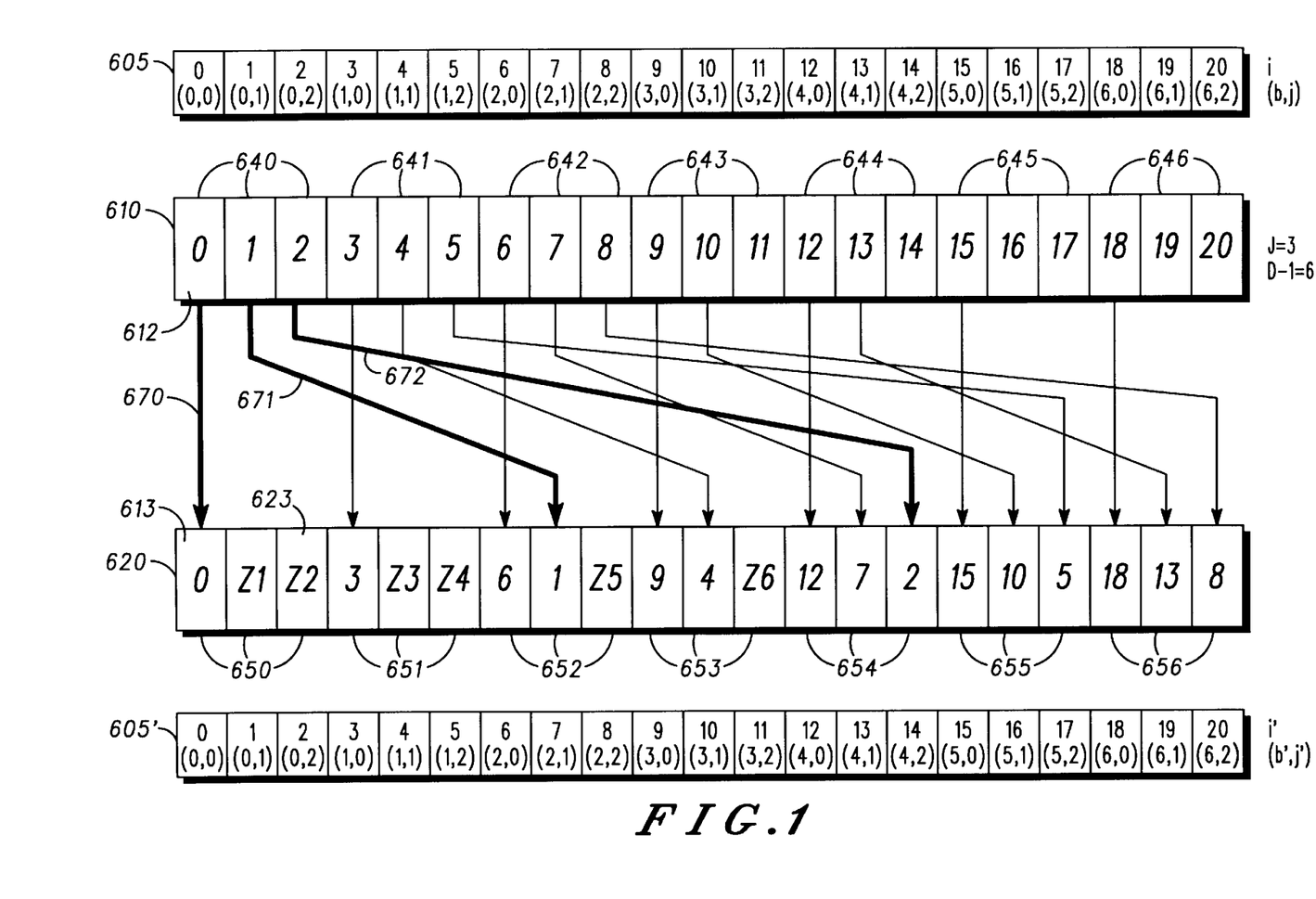
FIG. 1 illustrates interleaving, by way of example with an original data stream, an interleaved data stream, and index axes.

The general principle of interleaving is described first. FIG. 1 illustrates interleaving, by way of example, with original data stream 610 ("first sequence"), interleaved data stream 620, and index axes 605 and 605'. Original data stream 610, also {X-STREAM}, comprises a first plurality of code blocks 640–646:

$$\{X\text{-STREAM}\} = \{\{X\text{-BLOCK}\,0\} \quad (1)$$
$$\{X\text{-BLOCK}\,b\} \ldots$$
$$\{X\text{-BLOCK}\,B\}\},$$

as illustrated in the example of FIG. 1 with a block index b=0 to B=6. Each code block 640–646 ({X-BLOCK b} has a number of J ("length") data units 612 (also: X).

$$\{X\text{-BLOCK}\,0\} = \{X(0,0), X(0,j), X(0,J-1)\} \quad (2)$$
$$\{X\text{-BLOCK}\,b\} \quad \{X(b,0), X(b,j), X(b,J-1)\} \ldots$$
$$\{X\text{-BLOCK}\,0\} \quad \{X(B,0), X(B,j), X(B,J-1)\}$$

Index pair (b,j) has block index b and unit index j. Unit index j goes cyclically from j=0 to J-1, such as, for example, from j=0 to j=(J-1)=2.

A data unit 612 (X (b,j)) has, preferably, one byte of information. For convenience, index axis 605 counts data units 612 (also, X (i)) inside data stream 610 by index pair (b,j) and by single index i. Index i starts from i=0. Index i which is assumed to be indefinite is only limited here by M-1=20 due to the size of FIG. 1. For convenience of explanation, data units 612 (X (0) to X (20)) of original data stream 610 ({X-STREAM}) are illustrated with italic numbers 0 to 20 corresponding to index i. Counting with single index i and double index (b,j) is equivalent. For example: X (0)=X (0,0), X (1)=X (0,1), X (2)=X (0,2), X (3)=X (1,0), and so on. In general, indices i, b, and j are related by $$b=\text{integer}(i/J) \text{ and} \quad (3)$$
$$j=\text{mod}_J(i/J) \quad (4)$$

with the slash "/" standing for division, "integer" for the non-broken result and "mod" for modulo operation to the base J. Index i can be calculated from (b,j) according to:

$$i=b*J+j \quad (5)$$

With their indefinite nature, single indices i are conveniently used to define time points T0, T1, T2, to T20 (in general Ti). But the time aspect is not essential here, since interleaving/de-interleaving procedures can be used in non-time related applications as well.

Interleaved data stream 620 ("second sequence"), also {Y-STREAM} comprises a second plurality of code blocks 650–656: (6)

$$\{Y\text{-STREAM}\} = \{\{Y\text{-BLOCK}\,0\} \quad (6)$$
$$\{Y\text{-BLOCK}\,b'\} \ldots$$
$$\{Y\text{-BLOCK}\,B'\}\},$$

as illustrated in the example of FIG. 1 with a primed block index b'=0 to B'=6. Each code block 650–656 ({Y-BLOCK b'}) has a number of J'=J data units 613 (also: Y)

$$\{Y\text{-BLOCK}\,0\} = \{Y(0,0), Y(0,j'), Y(0,J'-1)\} \quad (7)$$
$$\{Y\text{-BLOCK}\,b'\} = \{Y(b',0), Y(b',j'), Y(b',J'-1)\}$$

-continued $$\{Y\text{-BLOCK } B'\} = \{Y(B', 0), Y(B', j'), Y(B', J'-1)\}$$

Similarly, index axis 605' counts data units 613 (Y) in data stream 620 with single index i' and double index (b',j'). Equations (3), (4) and (5) are applicable in the same way. Data units 613 (Y (i')) of interleaved data stream 620 have these italic numbers in a new order obtained by interleaving. Inside interleaved data stream 620, un-specified data units 623 identified here with e.g., Z1–Z7, preferably, do not come from original data stream 610.

Data units X (i)=X (b,j) of original data stream 610 are interleaved to a depth D−1 ((de)-interleave parameter), (here: D−1=6) and become data units Y (i')=Y (b',j') of interleaved data stream 620.

Indices i and i' of X (i)=Y (i') are thereby related by a difference d (j):

$$i'=i+d(j) \qquad (8)$$

$$d(j)=j*(D-1), \qquad (9)$$

with * for multiplication. For simplicity, d (j) is referred to as "delay", representing thereby for example, a time shift as required in the majority of interleaving/de-interleaving applications.

Double indices of X (b,j)=Y (b',j') are related by $$b'=b+d(j) \qquad (10)$$

$$j'=j \qquad (11)$$

$$d(j)=j*(D-1) \text{ same as above} \qquad (12)$$

For example, data units X (0)=X (0,0)=0, X (3)=X (1,0)=3, X (6)=X (2,0)=6, X (9)=X (3,0)=9, X (12)=X (4,0)=12, X (15)=X (5,0)=15, and X (18) (b incrementing, j=0) from original data stream 610 go to interleaved data stream 620 without delay (d(0)=0, indicated e.g., by line 670). Data units 1, 4, 7. 10, 13, and 16 (j=1) are delayed by d(1)=1 * 6=6, indicated by, e.g., line 671 for data unit X (1)=X (0,1)=1 at i=1 going to Y (7)=Y (2,1)=1 at i'=d(1)+i=7. According units 2, 5, 8, 11, 14, 17, 20 are delayed by d(2)=12. Line 672 shows how data unit X (2)=X (0,2)=2 at i=2 goes to i'=14 (Y (14)=Y (4,2)=2). Preferably, multiple of J.

In general, data units X (i)=X (b,j) in a first sequence {first} (e.g., original data stream 610) are distributed to data units Y (i')=Y (b'j') in a second sequence {sec} (e.g., interleaved data stream 620). {first} is, for example {0, 1, 2, ... 20}. {first} has subsequences {BLOCK}={X (i+0), X (i+1), X (i+j), ...X (i+(J−1))} which are J long, e.g., {0, 1, 2} (J=3). Data units X (i) of {BLOCK} are distributed by parameter (D−1) as $$X(i+0) \text{ to } Y(i'), \qquad (13)$$

e.g., X (0)=0 to Y (0)=0

X (i+1) to Y (i'+(D−1), e.g., X (1)=1 to Y (7)=1

X (i+j) to Y (i'+(D−1)*j)

X (i+(J−1) to Y (i'+(D−1)*J), e.g., X (2)=2 to Y (14)=2

Figure 2:
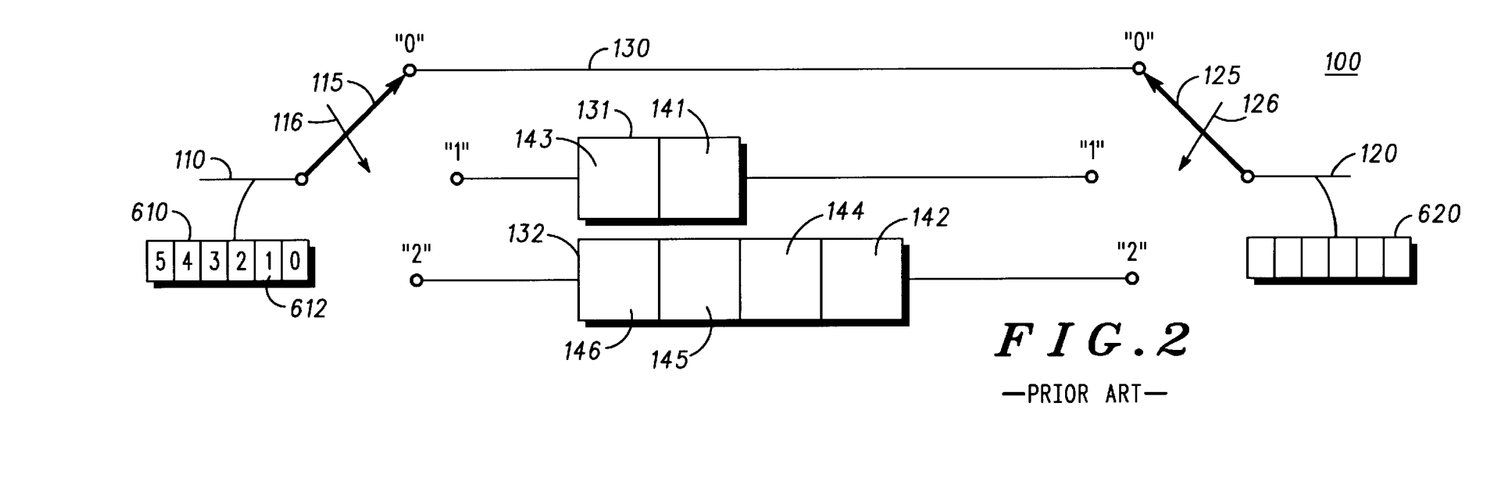
FIG. 2 illustrates an interlaever known in the prior art.

FIG. 2 illustrates interleaver 100 as known in the prior art. Interleaver 100 comprises a number of (J−1) (here: (J−1)=2) delay lines 131 and 132 and zero-delay line 130, write switch 115 and read switch 125. Interleaver 100 receives original data stream 610 with data units 612 on input line 110. Arrow 116 in write switch 115 (which has J=3 positions) symbolizes how in every time point Ti write switch 115 couples input line 115 to zero-delay line 130 (position "0" or "j=0"), to delay line 131 (position "1" or "j=1"), to delay line 132 (position "2" or position "J−1") and again to zero-delay line 130 (position "0"), and so forth. Accordingly, arrow 126 shows how read switch 126 couples lines 130–132 to output line 132 (positions "0", "1", and "2"). Switches 115 and 125 couple one of lines 130–132 to input line 110 and to output line 120. For example, FIG. 2 shows switches 115 and 125 at position "0" coupling input line 110 and output line 120 via zerodelay line 130. Thereby, at every time point Ti (index i, see FIG. 1), write switch 115 consecutively distributes data units 612 to zero-delay line 130 and to delay lines 131–132. Simultaneously, read switch 125 multiplexes data units 612 to output line 120 resulting in interleaved data stream 620. Preferably, delay lines 131 and 132 are shift registers of the type first-in-first-out (EFO). Delay line 131 has a number of Δ1=2 storage cells 141, 143 (in short: cells) to store data units. Delay unit 132 has a number of Δ2=4 storage cells 142, 144, 145, and 146. The numbers Δ1 and Δ2 depend on the depth parameter (D−1). In general, a delay line at position "j" has Δj=j * (D−1)/J storage cells. Δj is also referred to as "FIFO-size".

Hence, zero-delay line 130 can be considered as a delay line with zero (0 * 6/2) storage cells. When switches 115 and 125 are at position "1", delay line 131 shifts the data unit from cell 141 to output line 120, shifts a data unit from cell 143 to cell 141, and shifts a data unit from input line 110 to cell 143. At the other switch positions "0" and "2", delay line 131 only stores but does not shift. Accordingly, when write switch 115 and read switch 125 are at position "2", delay line 132 shifts data units from cell 142 to output line 120, from cell 144 to 143, 145 to 144, 146 to 145, and input line 110 to cell 146. At other times (positions "0" and "1"), delay line 132 is idle (stores but does not shift).

Table I illustrates the operation of interleaver 100 of FIG. 2 by way of example for data streams 610 and 620 of FIG. 1. Table I has columns (1) to (6) and rows (1) to (20). Column (1) gives time points Ti, beginning with i=0. Column (2) gives the positions "0", "1", and "2" for both write switch 115 and read switch 125 ("SW"). Column (3) shows the data units X (i) of original data stream 610 coming into interleaver 100 at input line 110. Columns (4) and (5) show the content of delay lines 131 and 132 with data units X (i). For convenience, column (4) is divided into 2 fields for cells 143 and 141. Column (5) is divided into 4 fields for cells 146, 145, 144, and 142. Finally, column (6) shows data units how Y (i') they are combined to interleaved data stream 620 at output line 120. For convenience, some entries in columns (4) and (5) are written in boldface indicating a shift in delay line 131 or 132.

TABLE I

| (1) | (2) SW 115 | (3) X (i) inline 110 | (4) X (i) in delay line 131 | | (5) X (i) in delay line 132 | | | | (6) Y (i') at line 120 | rows |
|---|---|---|---|---|---|---|---|---|---|---|
| Ti | 125 | 110 | 143 | 141 | 146 | 145 | 144 | 142 | 120 | |
| 0 | "0" | 0 | Z3 | Z1 | Z6 | Z5 | Z4 | Z2 | 0 | (1) |
| 1 | "1" | 1 | 1 | Z3 | Z6 | Z5 | Z4 | Z2 | Z1 | (2) |
| 2 | "2" | 2 | 1 | Z3 | 2 | Z6 | Z5 | Z4 | Z2 | (3) |
| 3 | "0" | 3 | 1 | Z3 | 2 | Z6 | Z5 | Z4 | 3 | (4) |
| 4 | "1" | 4 | 4 | 1 | 2 | Z6 | Z5 | Z4 | Z3 | (5) |
| 5 | "2" | 5 | 4 | 1 | 5 | 2 | Z6 | Z5 | Z4 | (6) |
| 6 | "0" | 6 | 4 | 1 | 5 | 2 | Z6 | Z5 | 6 | (7) |
| 7 | "1" | 7 | 7 | 4 | 5 | 2 | Z6 | Z5 | 1 | (8) |
| 8 | "2" | 8 | 7 | 4 | 8 | 5 | 2 | Z6 | Z5 | (9) |
| 9 | "0" | 9 | 7 | 4 | 8 | 5 | 2 | Z6 | 9 | (10) |
| 10 | "1" | 10 | 10 | 7 | 8 | 5 | 2 | Z6 | 4 | (11) |
| 11 | "2" | 11 | 10 | 7 | 11 | 8 | 5 | 2 | Z6 | (12) |
| 12 | "0" | 12 | 10 | 7 | 11 | 8 | 5 | 2 | 12 | (13) |
| 13 | "1" | 13 | 13 | 10 | 11 | 8 | 5 | 2 | 7 | (14) |
| 14 | "2" | 14 | 13 | 10 | 14 | 11 | 8 | 5 | 2 | (15) |

At T0, switches 115 and 125 are, for example, at position "0" so that data unit X (0)=0 is transmitted from input line 110 to output line 120 without delay (see line 670 in FIG. 1). At T0, delay lines 131 and 132 are filled with un-specified bits Z1 in cell 141, Z2 in 142, and so on (see 623 in FIG. 1).

At T1, switches 115 and 125 are at position "1". In delay line 131, Z1 is shifted from cell 143 to cell 141. Data unit 1 goes from input line 110 to shifting delay line 131. Z1 has left delay line 131 and goes to output line 120 (see 623 in FIG. 1). Delay line 132 is unchanged.

At T2, switches 115 and 125 are at position "2". Z2 has left delay line 132 and goes to output line 120. Z6, Z5, and Z4 are shifted inside delay line 132 making cell 146 free to receive data unit 2 from input line 110. Delay line 132 is unchanged.

At T3, switches 115 and 125 are again at position "0" and data unit 3 goes straight through interleaver 100 without delay. Delay lines 131 and 132 are unchanged.

Skipping to explain analogous operation in time points T4, T5, and T6, at T7 data unit 1 leaves delay unit 131 after the above mentioned delay of d(1)=T7−T1=6. This corresponds to line 671 in FIG. 1. In the same way, delay line 132 sets data unit 2 free at T14 only after a delay of d(2)=T14−T2=12.

In general, an interleaving method for the prior art interleaver can be described by the steps of: (1) moving (116, 126) switches 115 and 126, thereby selecting lines 130, 131, or 132; (2) shifting out data units from selected line (130, 131, or 132) to output line 120; (3) shifting data units inside selected line (130, 131, or 132); (4) shifting in data units from input line 110 to selected line (130, 131, or 132); (5) repeating steps (1) to (4).

According to the introduced apparatus and method of the prior art, it is a disadvantage to have a number of J−1 delay lines with, in total, (D−1) storage cells.

It is known in the art to have delay lines 331 and 332 with storage cells 141, 143, 142, 144, 145, 146 (2 FIFOs) implemented (mapped) by memory cells of e.g., a random access memory (RAM). Method and apparatus are described in U.S. pat. No. 5,592,492 to Ben-Efraim et al. However, multiple pointers are calculated by a computing unit.

According to the present invention, an interleaving/de-interleaving apparatus has a plurality of first-in-first-out memory registers (FIFOs) ("delay lines") mapped into memory (e.g., RAM). Each of the FIFOs is formed by memory cells virtually moving through the memory. The number of pointers to the cells can be reduced. Instead of two pointers for each FIFO as in the prior art, the (de)-interleaver of the present invention uses, preferably, only one pointer variable p for any number of delay lines mapped into the memory. The pointer comprises an offset parameter depending only on (D−1) and J. This gives the (de)-interleaver flexibility. Further, calculation time for p is saved because the (de)-interleaver reads data from memory locations and uses the same location for consecutively writing data. Set-up times can be reduced, thus increasing a data throughput rate.

For convenience of explanation, mathematical symbols used in the following are introduced. The variable p will be used as an index for storage cells and is an element of a set $\{P\}=\{0, 1, 2, 3, \ldots (P-1)\}$ comprising P positive integers ($p \in \{P\}$). For A, B being positive integers and $C \in \{P\}$, a modulo addition mod (A+B)=C is defined as $$C=(A+B) \text{ for } A+B \leq (P-1) \quad (14)$$

$$C=(A+B)-P \text{ for } A+B>(P-1) \quad (15)$$

A modulo subtraction is defined as $$C=(A-B) \text{ for } A-B \geq 0 \quad (16)$$

$$C=(A-B)+P \text{ for } A-B<0. \quad (17)$$

For example, in a set $\{P\}=\{0, 1, 2, 3\}$ of P=4 elements, and A=2 and B=3, C is calculated as:

$$C=\text{mod } (A+B) \text{ mod } (2+3)=1 \quad \text{(definition 15)}$$

$$C=\text{mod } (A-B) \text{ mod } (2-3)=3 \quad \text{(definition 17)}$$

For convenience, the number P of elements in set $\{P\}$, also called "base", can be indicated as subscript, such as in e.g., $\text{mod}_p (A+B)$.

The symbol ":=" (colon with equal sign), which is commonly used in the programming art, illustrates that a variable (e.g., C) standing left of ":=" is assigned the value expressed to the right of ":=". The variable on the left can appear also on the right side. For example, in "C:=C+1", variable C having an initial value of e.g., C=2, is incremented by 1 and obtains the final value C=3.

Figure 3:
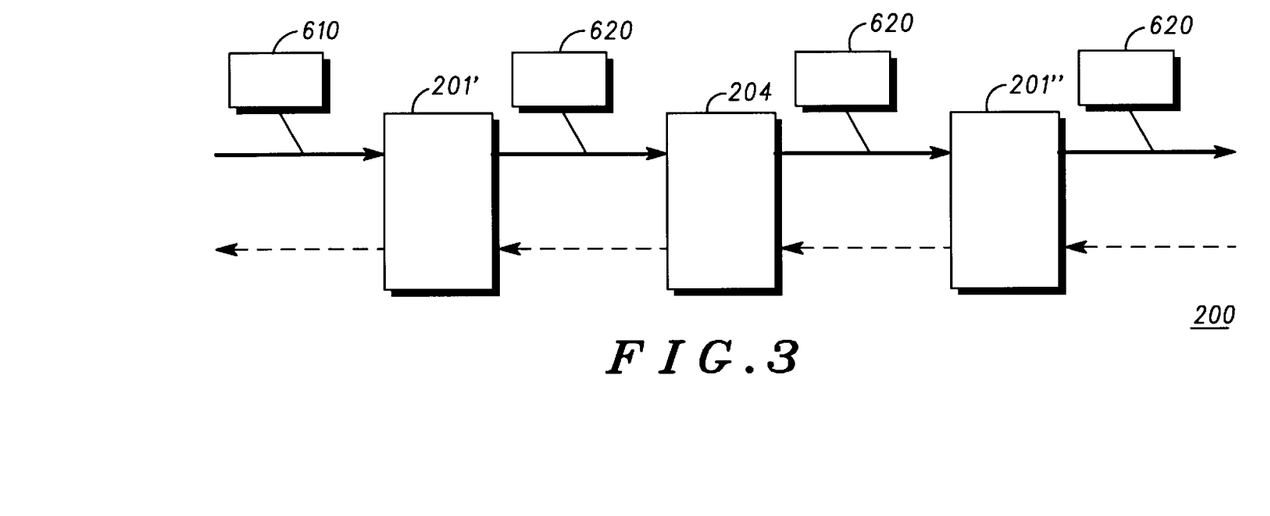
FIG. 3 illustrates a simplified block diagram of a data transmission system comprising an interleaver (or first (de)-interleaver), a channel and a de-interleaver (or second (de)-interleaver) according to the present invention.

FIG. 3 illustrates a simplified block diagram of data transmission system 200 comprising interleaver 201'(or first (de)-interleaver), channel 204 and de-interleaver 201" (or second (de)-interleaver) according to the present invention. Interleaver 201' receives original data stream 610 and provides interleaved data stream 620 to channel 204. Channel 204 transmits stream 620 to de-interleaver 201" which de-interleaves stream 620 to original data stream 610'. A preferred data stream flow is indicated in FIG. 3 by arrows going to the right. This is convenient for explanation, but not essential for the invention.

As it will be explained further, transmission system can operate also in the opposite direction shown by dashed arrows going to the left.

Figure 4:
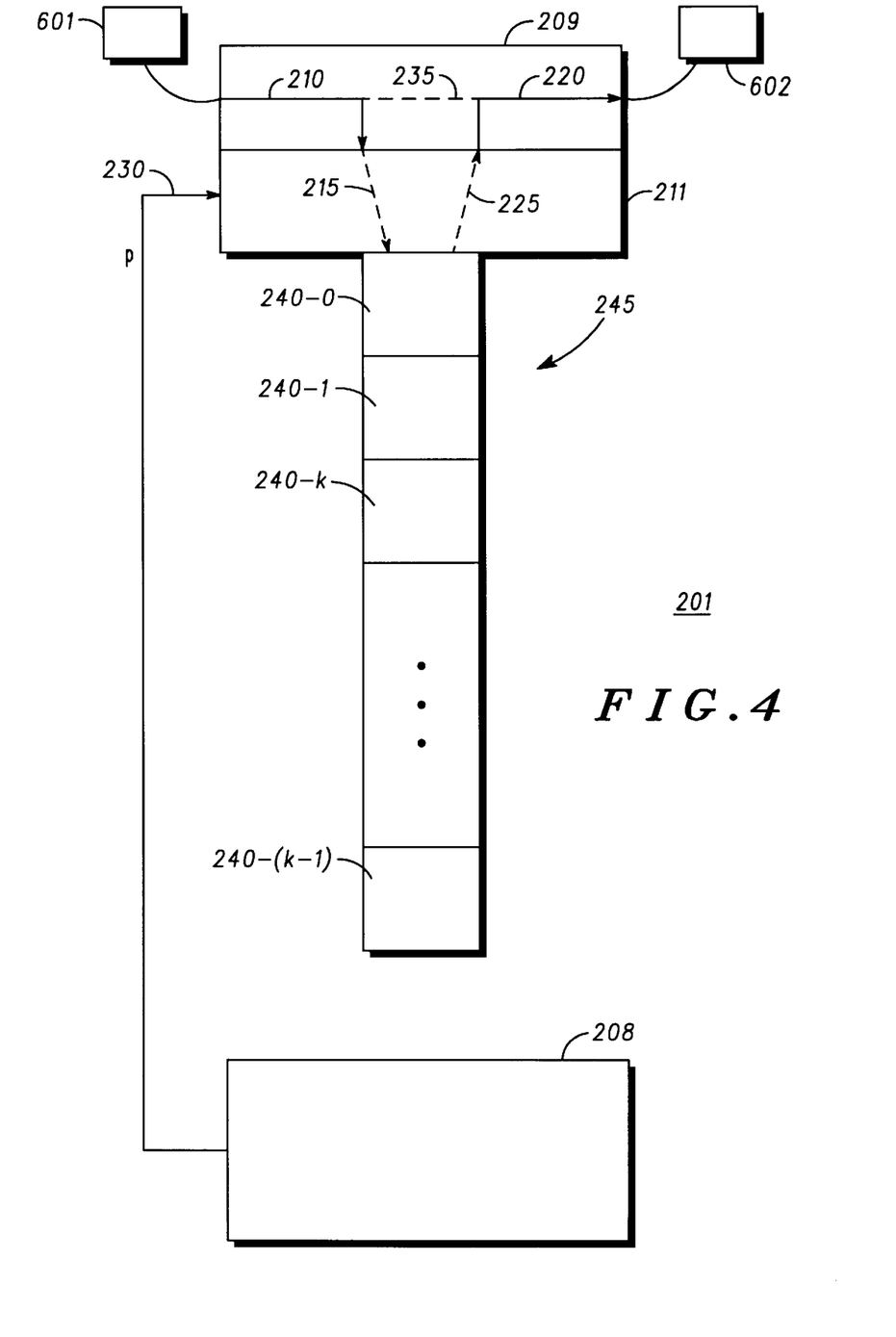
FIG. 4 illustrates a simplified block diagram of the (de)-interleavers of FIG. 3.

FIG. 4 illustrates a simplified block diagram of interleaver 201'/de-interleaver 201" (hereinafter (de)-interleaver 201) of FIG. 3. Unless otherwise specified, the description concentrates to the function of interleaver 201'. A person of skill in the art is able, based on the description herein, to implement de-interleaver 201" accordingly.

(De)-interleaver 201 comprises memory 245, pointer generator 208 (hereinafter generator 208), and memory controller 211 (hereinafter controller 211). De)-interleaver 201 receives input stream 601 at input line 210 and provides output stream 602 at output line 220. Lines 210 and 220 are, preferably, implemented by data bus 209. Data bus 209 can carry data, for example, parallel or serially. Data bus 209 with input line 210 and output line 220 is coupled to controller 211. Controller 211 is coupled to memory 245.

When (de)-interleaver 201 operates as interleaver 201' then input stream 601 is, e.g., original data stream 610 and output stream is, e.g., interleaved data stream 620. When (de)-interleaver 201 operates as de-interleaver 201", than this relation is inverted. Optionally, controller 211 can comprise storage means (not shown) for temporarily buffering data units.

Pointer generator 208 supplies pointer 230 (hereinafter pointer p) to controller 211. Memory 245 comprises a plurality of K or more storage cells 240-k (e.g., k=0 to K−1, hereinafter "cells", "memory locations", or "memory cells" in singular or plural used as synonyms). In difference to prior art interleaver 100 of FIG. 2, cells 240-k and 240-(k+1) or 240-(k−1) are, preferably, not coupled to each other for the purpose of shifting data For explanation, it is assumed that one cell 240-k can store one data unit X (b,j) (612 of FIG. 1) or Y (b',j') of e.g., one byte. This is convenient, but not essential for the invention. A person of skill in the art is able, based on the description herein, to organized memory 245 in a different way without departing from the scope of the invention. As used herein, cell 240-p, should mean a cell 240-k which is addressed by pointer p. Pointer p is an element of the set {P}={0, 1, 2, 3, . . . (P−1)} wherein (P−1)≦(K−1). In other words, pointer p identifies cell 240-p and activates cell 240-p for the exchange of data.

To explain a method of the present invention in reference to FIGS. 5–8, keywords (here underlined) are introduced which describe a method step. In a receiving step, (de)-interleaver 201 puts one data unit X (b,j) from input stream 601 to input line 210. In a writing step illustrated by dashed line 215, controller 211 stores X (b,j) from input line 210 in cell 240-p. Data previously stored in cell 240-p is thereby overwritten. In a reading step illustrated by dashed line 225, controller 211 copies the data stored in cell 240-p as data unit Y (b',j') to output line 220. During reading, data in cell 240-p can remain unchanged or can be deleted. But such a distinction is not essential for the invention. In a providing step, (de)-interleaver 201 puts one data from output line 220 to output stream 602. In a bypassing step, (de)-interleaver 201 advances a data unit X (b,j) from input line 210 to output line 220. Thereby, controller 211 can send data unit X (b,j) into memory 245 for storage, but this is not essential for the invention. The bypassing step is illustrated by dashed line 235 going from input line 210 to output line 220. The bypassing step is the equivalent to the operation of zero-delay line 130 of FIG. 2 in which data units are transported without substantial delay.

In a setting step, pointer generator 208 assigns a predetermined initial value to pointer p or to a different variable. It is convenient for explanation to initially set pointer p to a value 0 (zero). But this is not essential for the present invention. In an incrementing step, pointer generator 208 changes a variable, such as pointer p, by summation or subtraction, by a predefined value. Although it is convenient to assume an incrementing by a value of 1, other values (such, as 2, or even negative integers) can also be used. The term "incrementing" with all its language variations is intended to include "decrementing", "adding a number", or "subtracting a number". In a modulo incrementing step, pointer generator 208 increments a variable according to the modulo operations cited in definitions (14) to (18) given above. The modulo incrementing step is a special case of the incrementing step. In a repeating step, some or all of above mentioned steps are performed again. The repeating step defines a cycle.

(De)-interleaver 201 uses its memory 245 as a delay line (cf. FIG. 1). In comparison to the prior art, where one delay line (FIFO) is implemented by fixed memory sections, (de)-interleaver 201 of the present invention uses all cells to implement all delay lines. Pointer generator 208 knows values $\Delta j$, also called "FIFO-size". The values $\Delta j$ are calculated once and stored in generator 208 or calculated by generator 208 at the time they are required. For example, when convolutional interleaving as shown in FIG. 1 is performed, values $\Delta j$ are:

$$\Delta j = j^*(D-1)/J, \text{ for } j=1 \text{ to } J-1, \tag{18}$$

but other values can also be used. Values $\Delta j'$ with a primed index j' are calculated in the same way. For example, to perform (de)-interleaving according to the example of FIG. 1, with parameters (D−1)=6 and J=3, $\Delta j$ are $\Delta 1=2$ and $\Delta 2=4$. $\Delta j$ correspond to the sizes of delay lines 131 and 132. (De)-interleaver 201 writes/reads data units X and Y to/from cells which are at $\Delta j$ distance located in memory 245. The number K of cells 240-k of memory 245 is equal or larger than the sum of $\Delta j$ for j=1 to (J−1):

$$K \geq \sum_{j=1}^{J-1} \Delta j = (D-1) \tag{19}$$

Preferably, memory 245 temporarily stores data units X (bj) with $0<j\leq J-1$ and data units Y (b40,j') with $0<j'\leq J'-1$.

It is convenient for calculating pointer p, that generator 208 knows partial sums, further referred to as offsetj):

$$\text{offset}(j)=\Delta 1+\Delta 2+\ldots \Delta(j-1)+\Delta j \tag{20}$$

The offset(j) can be equal to the number K of cells 240-k. Offset(j) is a convenient abbreviation for purposes of explanation. Offset(j) can also be stored in generator 208, but this is not essential for the invention. When offset(j) is added to p (or subtracted from p) (p∈{P}) then modulo addition or subtraction is applicable.

Figure 5:
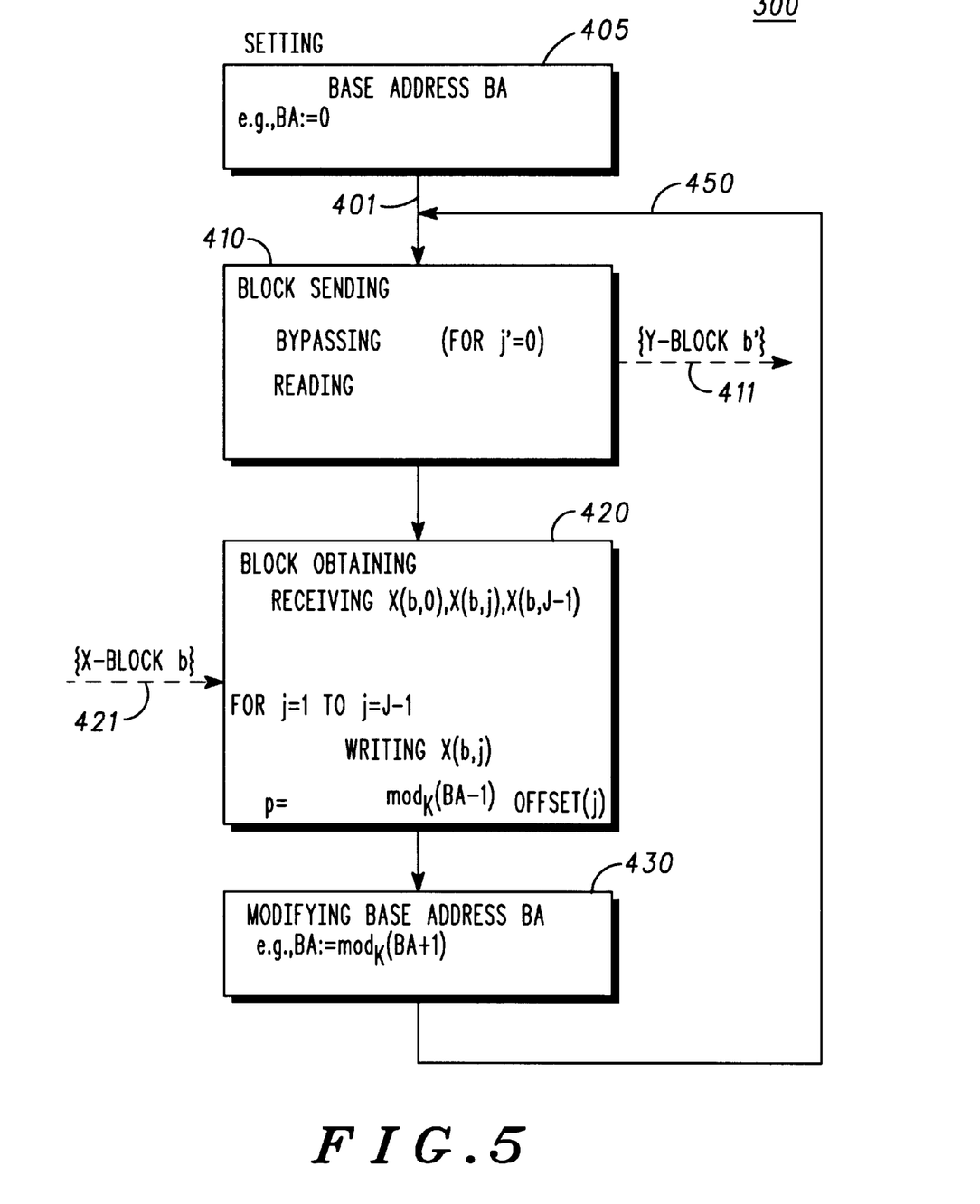
FIG. 5 is a simplified flow chart diagram illustrating a method of the present invention.

FIG. 5 is a simplified flow chart diagram illustrating method 300 of the present invention. Method 300 comprises base address (BA) setting step 405, block sending step 410, block obtaining step 420, BA modifying step 430 which are, preferably, performed consecutively. As repeating step 450 symbolizes, steps 410, 420 and 430 are repeated. Steps 410 and 420 are steps of a block loop. In FIG. 5, plain lines with arrows between the steps refer to a preferred method flow, wherein dashed lines 411 and 421 symbolize that (de)-interleaver 201 exchanges data units at lines 210 and 220 with its environment, such as e.g., channel 204. (De)-interleaver 201 follows the steps of method 300 with, preferably, the following details:

During BA setting step 405, BA is assigned any value between 0 and K−1, such as BA:=0. Block sending step 410 comprises providing block {Y-BLOCK b'} of data units Y (b',0), Y (b',j), Y (b',J'−1) by (a) bypassing X (b,0) as Y (b',0) for j'=0 or (b) reading Y (b',1), Y (b',j'), . . . X (b',J−1) from cells 240-p identified by:

$$p = \text{mod}_K(\text{BA} + \text{offset}(j)). \tag{21}$$

While BA remains constant, offset(j) is different for every reading event. Block obtaining step 420 comprises receiving block {X-BLOCK b} of data units X (b,0), X (b,j), X (b,J−1) and writing X (b,1), X (b,j) to X (b,J−1) into cells 240-p identified by:

$$p = \text{mod}_K(\text{BA} + \text{offset}(j)). \tag{22}$$

During step 420, BA remains, preferably, unchanged. BA modifying step 430 preferably includes that base address BA is modulo incremented by 1:

$$\text{BA} := \text{mod}_K(\text{BA} + 1) \tag{23}$$

or modulo decremented by 1:

$$\text{BA} := \text{mod}_K(\text{BA} - 1) \tag{24}$$

In repeating step 450, block sending step 410, block obtaining step 420, and BA modifying step 430 are repeated for the next blocks.

Figure 6:
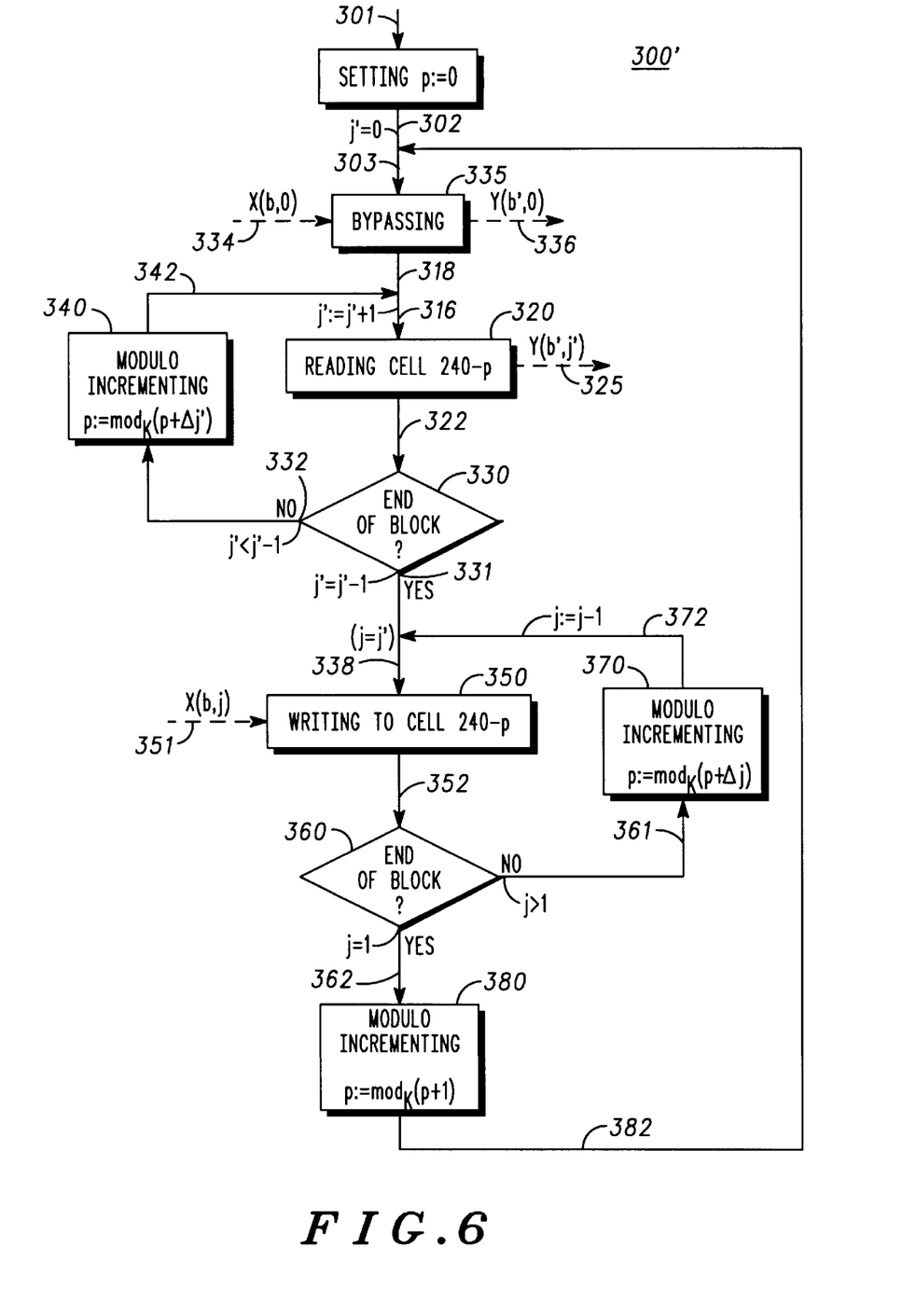
FIG. 6 is a simplified flow chart diagram illustrating the method of FIG. 5 in a preferred implementation.

FIG. 6 is a simplified flow chart diagram illustrating method 300' which is a preferred implementation of method 300 of FIG. 5 of the present invention, but giving greater detail.

Method 300' comprises setting step 310, bypassing step 335, reading step 320, writing step 350, modulo incrementing steps 340, 370, and 380, and query steps 330 and 360. Plain lines 301, 302, 303, 316, 318, 322, 331, 332, 338, 342, 352, 361, 362, 372, and 382 having arrows indicate a preferred method flow, wherein dashed lines 325, 334, 336 and 351 indicate the handling of data units. Auxiliary variables j, j', and J=J' which correspond to indices of FIG. 1 are given here only for the convenience of explaining the generation of pointer p. A person of skill in the art is able, based on the description herein, to modify method 300' by using other variables, but without departing from the scope of the present invention.

Assume that at start line 301, (de)-interleaver already knows parameters D−1, J=J', and Δj. Start line 301 goes to setting step 310. Line 302 and its continuation line 303 go to bypassing step 335. From there, line 318 and its continuation line 316 go to reading step 320. From there, line 322 goes to query step 330. For "NO" at query step 330, line 332 goes to modulo incrementing step 340. From there, line 342 goes to line 316. For "YES" at query step 330, line 331 and its continuation line 338 go to writing step 350.

From there, line 352 goes to query step 360. For "NO" at query step 360, line 361 goes to modulo incrementing step 370. From there, line 372 goes to line 338. For "YES" at query step 360, line 362 goes to modulo incrementing step 380. From there, repetition line 382 goes to line 303. Dashed line 334 (data units X (b,0)) goes to bypassing step 335 and dashed line 336 (data units Y (b',0) leaves bypassing step 335. Dashed line 325 (data units Y (b',j'), j'>0) leaves reading step 320. Dashed line 351 (data units X (b,j), j>0) goes to writing step 350.

Assuring that (de)-interleaver 201 starts operating at line 301, generator 208 sets pointer p to e.g., p:=0 in setting step 310. With e.g., j'=0, (de)-interleaver 201 is bypassing (step 335) data units X (b,0) (line 334) as data units Y (b',0) (line 336).

Y (b',0) belongs to {Y-BLOCK b'}. At line 316, (de)-interleaver 201 enters a first cycle. With e.g., j' incremented by 1 (j':=j'+1 at line 316), (de)-interleaver 201 is reading (step 320) data from cell 240-p, thus obtaining Y (b'j'). (De)-interleaver 201 is now checking in query step 330 if {Y-BLOCK b'} has reached its last data unit Y (b',J'−1). If not ("NO" at line 332 for e.g., j'<J'−1), pointer p is modulo incremented (step 340): p := mod$_K$(p+Δj). Then (line 342), with j' again incremented (j':=j'+1 at line 316), (de)-interleaver 201 is reading (step 320) data from the next cell 240-p as a new Y (b',j'). Reading step 320 and modulo incrementing step 340 is repeated until the last data unit Y (b',J'−1) of {Y-BLOCK b'}. For "YES" (line 331) at query step 330, with e.g., j'=J'−1, (de)-interleaver 201 goes at continuation line 338 into a second cycle. For convenience of explanation, unprimed indices j and J−1 are used (j=j' and J'−J) from here on. (De)-interleaver 201 is repeatedly writing X (b,j) (step 350) data units X (b,j) into cells 240-p distanced by different Δj. In detail, after every writing step 350, (de)-interleaver queries (step 360) whether the block end (for j=J−1) has been reached or not. A block end check is performed here in a similar way as in the above explained first cycle by comparing j to J−1. For j>1 ("NO", line 361), (de)-interleaver 201 is modulo incrementing pointer p:=mod$_K$(p+Δj). At line 372, index j is e.g., decremented (:=j−1) for performing writing step 350 again. After having written (step 350) all X (b,j) (j=1 to J−1) of {X-BLOCK b} into a number of (J−1) cells 240-p distanced by varying Δj, ("YES" query 360 at line 362, second cycle finished) pointer p is, preferably, incremented:

$$p := \text{mod}_K(p+1). \tag{26}$$

The new pointer p has the function of a modified base address (BA) (cf. step 430 of FIG. 5) and (de)-interleaver 201 continues operation with new blocks {Y-BLOCK b'+1} and {X-BLOCK b+1} by repeating (line 382) bypassing step 335 and the first and second cycles.

Figure 7:
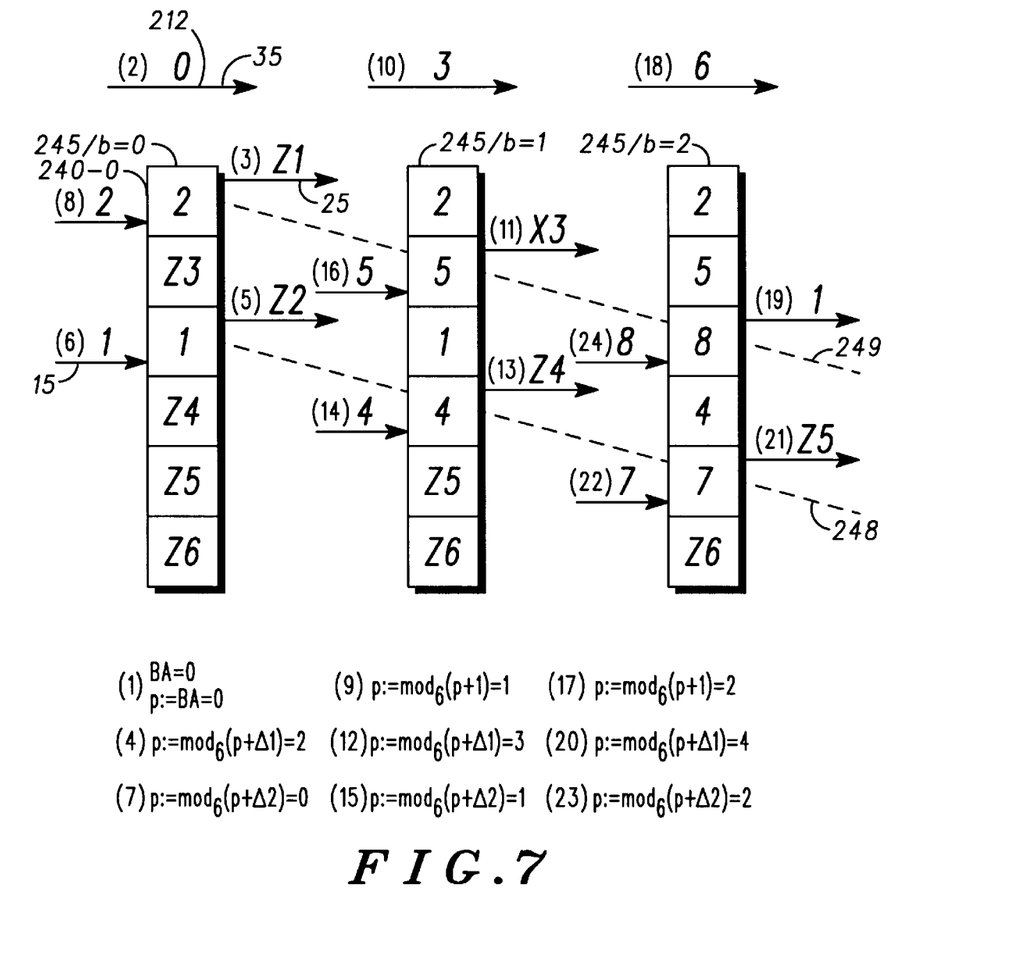
FIGS. 7–8 illustrate the operation of (de)-interleaver FIG. 4 according to the method of FIG. 6 by time-slices.
Figure 8:
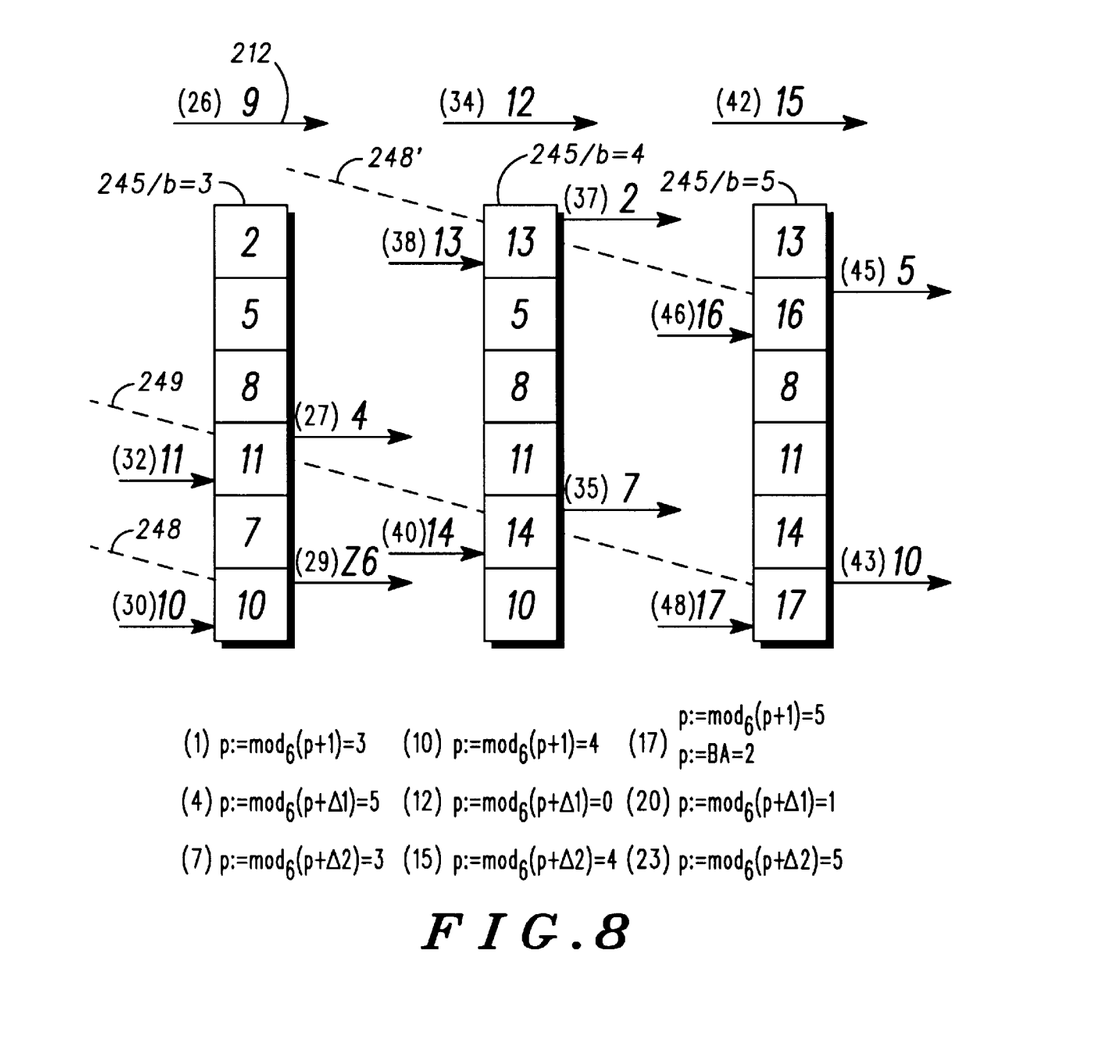

Having generally described method 300 of the present invention in reference to FIGS. 5–6, the general interleaving example of FIG. 1 is applied. FIGS. 7–8 illustrate the operation of (de)-interleaver 201 according to method 300' by time-slices. FIGS. 7–8 show time-slices of memory 245 in interleaver 201 (FIG. 4), data units X going into memory 245, data units Y going from memory 245, and data units X=Y bypassing memory 245. Method 300 of FIGS. 5–6 of the present invention is illustrated for K=Δ1+Δ2=2+4=6 storage cells 240-k (k=0 to 6). Time-slices are identified as 245/b=1, 245/b=2 and so on to 245/b=5 with b as the block index within data stream 610 (cf. FIG. 1). Arrows 15 going to cells 240-k illustrate writing steps. Accordingly, arrows 25 beginning at cells 240-k illustrate reading steps. Arrows 35 represent the bypassing step. Large italic FIGS. 1 to 17 as well as Z1 to Z6 attached to arrows 15, 25, and 35 or given within cells 240-k symbolize the same data units X and Y of FIG. 1. As in the example of FIG. 1, interleave parameters are J=2 and D−1=6. Reference numbers (1) to (43) in parenthesis () are provided for the convenience of explanation and give a preferred method flow for the example.

Table II gives the relation between method 300' in the general detailed illustration of FIG. 6 to the example of FIGS. 7–8. The two columns on the left side explain the example of FIG. 7–8 in reference to numbers (1) to (9) for time-slice 245/b=1. The two columns on the right side give the correspondence to the steps and lines of method 300' (FIG. 6).

TABLE II

| example in FIGS. 7–8 | | method 300' in FIG. 6 | |
|---|---|---|---|
| reference (1)–(9) | step of doing | reference 301–382 | step of doing |
| | given parameters and derived values e.g. J = 3, (D − 1) = 6, Δ1 = 2, Δ2 = 4 | 301 | |
| (1) | setting p := 0, j' = 0 | 310, 302 | |
| (2) | by passing X (0,0) = Y (0,0) = 0 | 303, 335, 334, 336 | by passing X (b,0) to Y (b',0) |
| | j' = 1 | 318, 316 | j' := j' + 1 |
| (3) | reading Y (0,1) = Z1 (p = 0) | 320, 325 | reading from 240-p as Y (b',j') |
| | j' = 1 < (J' − 1) = 2 | 322, 330, 332 | end of block? "NO" |
| (4) | mod incrementing p by Δ1 = 2 p := mod$_6$ (0 + 2) = 2 j' = 2 | 340, 342 316 | modulo incrementing p := mod$_K$ (p + Δj') j' := j' + 1 |
| (5) | reading Y (0,2) = Z2 (p = 2) | 320, 325 | reading from 240-p as Y (b',j') |
| | j' = 2 = (J' − 1) = 2 | 332, 330, 331 | end of block? "YES" |
| (6) | writing X (0,1) = 1 (p = 2) | 338, 350, 351 | writing X (b,j) into 240-p |
| | j = 2 > 1 | 360, 361 | end of block? "NO" |
| (7) | mod incrementing p by Δ2 p := mod$_6$ (2 + 4) = 0 j := 1 | 370 372 | modulo incrementing p := mod$_K$ (p + Δn) j := j − 1 |
| (8) | writing X (0,2) = 2 (p = 0) | 338, 350 | writing X (b,j) into 240-p |
| | j = 1 | 360, 362 | end of block? "YES" |
| (9) | p := mod$_6$(0 + 1) = 1 | 380 382 | modulo incrementing p p := mod$_K$ (p + 1) back to line 303 |

Having described the present invention in connection in details with FIGS. 3–8, the differences to the prior art (of e.g., FIG. 2) are explained in more detail. (De)-interleaver 201 can be considered is an interleaver/de-interleaver (cf. interleaver 100 of FIG. 2) of the type having switches (cf. switches 115 and 125) which selectively (e.g., positions "0", "1", "2") couple one of (J−1) shift lines j (=1 to J−1) (e.g., delay lines 131 and 132) with shifts Δ1, ... ΔJ−1 (e.g., Δ1=2 and Δ2=4) between an input line (e.g., 110) and an output line (210). According to the present invention, (de)-interleaver 201 comprises a memory (e.g., memory 245) having a total number of K≦Δ1+Δ2+...+Δj+...Δ(J−1) (or more) cells 240-k for storing data units X. The memory acts as (J−1) shift lines, that means the memory has the function of a FIFO *register. Having the function of switches (acting as), generator 208 makes one of cells 240-k an activated cell 240-p at a time by pointing to it. Generator 208 knows Δ1, Δ2, ..., Δj, ..., Δ(J−1). (De)-interleaver 201 does the following: (a) In a first cycle (e.g., block sending step 410 of FIG. 5) (de)-interleaver 201 reads data units Y from Δj distanced activated cells 240-p into output line 220. (b) In a second cycle (which follows the first cycle), (de)-interleaver 201 writes data units X from input line 210 into Δj distanced activated cells 240-p. (c) The cycles are repeated (e.g., repeating step 450 in FIG. 5).

The pointer p is calculated by modulo operation (addition or subtraction) to the base K. In the first cycle (a), pointer p goes from an initial pointer (e.g., p=BA) in a first direction (e.g., p goes to higher values). In the second cycle (b), pointer p returns in a second, opposite direction to its initial value (e.g., BA) changed by an delta value (e.g., ΔBA). In this way, it is guaranteed that data units stored over multiple cycles are not overwritten.

Preferably, (de)-interleaver 201 goes into the second cycle (b) with that cell 240-p which has been activated at the end of the first cycle (a). Generator 208 has pointer p pointing to the same cell 240-p and saves thereby calculation time ("set-up time") required to activate cell 240-p. For example, in time-slice 245/b=0 of the example of FIGS. 7–8, (de)-interleaver 102 is reading Z2 from cell 240-2 and than writing 1 into the same cell 240-2.

The shift lines (or FIFOs) are implemented by cells 240-p which virtually move cyclically inside memory 245. For example, in the prior art interleaver 100 of FIG. 2, delay line 131 carries only data units X (b,j) identified by j=1, these are data units 1, 4, 7, 10, and 13. In the examples of FIGS. 7–8 illustrating the present invention, one could, e.g., draw diagonal line 248 and its continuation 248' (shown dashed) through time slices 245/b=0 to 245/b=5 for elements X (0,1)=1 in 240-2, X (1,1)=4 in 240-3, X (2,1)=7 in 240-4, X (3,1)=10 in 240-5, X (4,1)=13 in 240-0, and X (5,1)=16 in 240-1. Or, one could image a diagonal line 249 through time slices 245/b=0 to 245/b=5 for elements X (0,2)=2 in 240-0, X (1,2)=5 in 240-1, X (2,2)=8 in 240-2, X (3,2)=11 in 240-3, X (4,2)=14 in 240-4, and X (5,2)=17 in 240-5. such diagonal lines could be drawn for all X (b,2) elements too.

The shift (or FIFO-sizes) Δ1, Δ2, Δj, to Δ(J−1) are programmable, that means, (de)-interleaver can be used for (de)-interleaving with varying parameters (D−1) and J. Prior art interleaver 100 can only perform (de)-interleaving according to fixed parameters (D−1) and J.

Generator 208 of (de)-interleaver 201 is, preferably, a processor. It is further in the scope of the present invention to embody generator 208 as dedicated hardwired circuitry. As mentioned above, Δj can be stored within generator 208 or can be calculated at the time it is needed.

Figure 9:
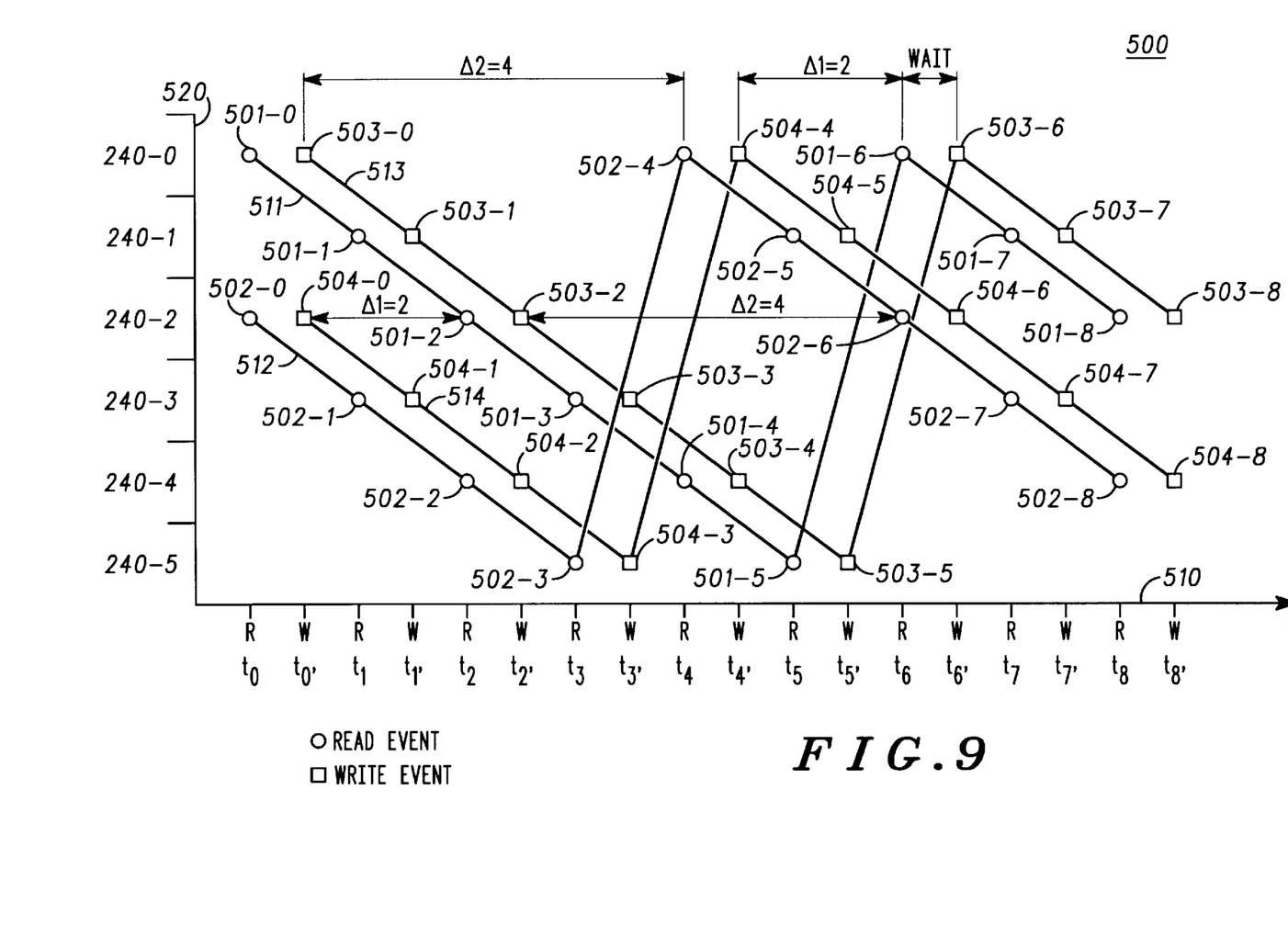
FIG. 9 illustrates the method of FIG. 5 by an event table.

FIG. 9 illustrates method 300 of the present invention by event table 500. Event table 500 is intended to be an example for the operation of (de)-interleaver 201 but not limited thereto. Event table 500 has a horizontal time axis 510 having e.g., time points $t_0$, $t_0'$, $t_1$, $t_1'$, $t_2$, $t_2'$, and so on to $t_8$, $t_8'$ and a vertical axis 520 representing e.g., cells 240-0 to 240-5 (cells 240-p). Circle symbols 501-0 to 501-8 and 502-0 to 502-8 represent reading events which take place at time points to to t. ("R"). Square symbols 503-0 to 503-8 and 504-0 to 504-8 represent writing events which take place at primed time points $t_0'$ to $t_8'$ ("W"). A reading event can be performed as described, for example, in connection with step 320 of FIG. 6 and a writing event can be performed as described, for example, in connection with step 350 of FIG. 6. For simplicity, events, such as 501-0/502-0 and 503-0/

504-0 are shown at the same time points $t_0$ and $t_0'$, respectively. Also, unprimed time points t and primed time points t' are illustrated at equal distances. Such simplification are convenient for explanantion, but not essential for the present invention.

For convenience of understanding, sequences of reading events 501 and 502 are connected by reading lines 511 and 512, respectively. Similarly, writing events 503 and 504 are connected by writing lines 513 and 514, respectively. Writing line 513 is parallel to reading line 511 and follows reading line 511 at a short time distance of preferably, $t_0'-t_0$. The short time distance is convenient, but not essential for the invention. Similarly, writing line 514 and reading line 512 are parallel also have a short time distance. Prefereably, the time distances between lines 513 and 511 and between 514 and 512 are equal. (De)-interleaving is illustrated by having reading line 511 crossed with reading line 512 and having writing line 513 crossed with writing line 514. Preferably, reading lines 511 and 512 and writing lines 513 and 514 follow cells 240-p with modulo incrementing p. For example, during reading event 501-0, (de)-interleaver 201 provides that data unit from cell 240-0. (De)-interleaver 201 uses the same cell 240-0 for writing event 503-0. After a first time delay ($\Delta 2=4$), cell 240-0 is involved at reading event 502-4 and writing event 5044. Then, after a second time delay ($\Delta 1=1$), cell 240-0 is used for reading event 501-6 and writing event 503-6.

In general, the time distances between writing lines and reading lines (e.g., $\Delta 1=2$ between from line 514 to 511 and $\Delta 2=4$ from line 513 to line 502) are determined by values $\Delta j$ (cf. equation 18). The distances between parallel reading and writing lines are an indicator of the efficiency of (de)-interleaver 201. After reading a data unit Y from cell 240-p, the information stored in cell 240-p can be overwritten by the next writing step. It will be appreciated that although only one particular embodiment of the invention has been described in detail, various modifications and improvements can be made by a person skilled in the art based on the teachings herein without departing from the scope of the present invention.

We claim:

1. A data transmission system comprising an interleaver and a de-interleaver adapted to communicate with a channel; wherein said interleaver interleaves an original data stream by an interleaving parameter (D−1) so that said original data stream is divided in data blocks with J data units j=0 to J−1; wherein said de-interleaver recovers said data stream by use of said interleaving parameter; and wherein said interleaver and said de-interleaver each has a memory for writing and reading said data units to memory locations identified by a single pointer and a pointer generator for generating said pointer during interleaving and de-interleaving; said pointer generator cyclically modulo incrementing said pointer by $\Delta j$, with $\Delta j=j * (D-1)/J$ wherein j is cyclically incremented in the range from j=1 to (J−1) everytime the pointer is incremented.

2. A method used in an interleaving/deinterleaving system with a number of K memory cells being addressed by a pointer $p \in \{K\}$, said system receiving first data units X (b,j) and providing second data units Y (b',j'), said X (b,j) being arranged in first blocks {X (b,0), X (b,1), X (b,j), X (b,(J−1))}, said Y (b',j) being arranged in second blocks {Y (b',0), Y (b',1), Y (b',j'), Y (b',(J'−1))}, with J being a first parameter, first data units X (b,j) in said first blocks being transformed to second data units Y (b',j') of said first data blocks according to:

Y (b',j') =X (b,j) for b'=b+$\Delta$j, and j'=j, said method comprising the steps of:
(1) reading a data unit Y (b',j') from storage cells identified by p;
(2) modulo to base K incrementing said pointer p by $\Delta j$, beginning with $\Delta j$ for j=1, and modulo incrementing j by 1;
(3) repeating steps (2) and (3) until j=(J−1);
(4) receiving a data unit X (b,j) (j≈0) into a storage cell identified by said pointer p;
(5) modulo incrementing said pointer p by $\Delta j$ and modulo decrementing j by 1;
(6) repeating steps (4) and (5) until j=1.

3. The method of claim 2 wherein said $\Delta j$ is related to j according to:
$\Delta j=j * (D-1)/J$, and wherein (D−1) is second parameter.

4. The method of claim 2 wherein when said writing step is performed a first time after the reading step was performed a last time, said pointer p does not change.

5. The method of claim 2 further comprising a step of setting a pointer p to any value between 0 and K−1, said step being executed once prior to said step (1).

6. The method of claim 2 so that first-in-first-out (FIFOs) registers are mapped in such a way that storage cells having indices k and k±1 belong to different FIFOs and wherein the location of every FIFO moves cyclically within said K memory cells.

7. The method of claim 2 further comprising a step of receiving one of said first data units X (b,0) (j=0) and providing one of said second data units Y (b',0) writing X (b,0) into one of said memory cells.

8. An interleaving/de-interleaving apparatus with a first parameter J and a second parameter (D−1), said apparatus receiving first data units X (b,j) in a first sequence $$\{X\text{-STREAM}\} = \{\{X\text{-BLOCK }0\}$$
$$\{X\text{-BLOCK }b\} \dots$$
$$\{X\text{-BLOCK }B\}\}$$
$$= \{\{X(0, 0), X(0, j), X(0, J-1)\}$$
$$\{X(b, 0), X(b, j), X(b, J-1)\} \dots$$
$$\{X(B, 0), X(B, j), X(B, J-1)\}\}$$

and providing second data units Y (b',j') in a second sequence $$\{Y\text{-STREAM}\} = \{\{Y\text{-BLOCK }0\}$$
$$\{Y\text{-BLOCK }b'\} \dots$$
$$\{Y\text{-BLOCK }B'\}\}$$
$$= \{\{Y(0, 0), Y(0, j'), Y(0, J'-1)\}$$
$$= \{Y(b', 0), Y(b', j'), Y(b', J'-1)\} \dots$$
$$= \{Y(B', 0), Y(B', j'), Y(B', J'-1)\}\}$$

wherein, in said second sequence, second data units Y (b',j') are equal to first data units when indices are b'=b+(j * (D−1)) andj=j,
said apparatus comprising:
a generator knowing values
$\Delta j=j * (D-1) J$, for j=1 to J−1, and
offset(j) =$\Delta 1+\Delta 2+\dots \Delta(j-1)+\Delta j$ and
providing a pointer p (0<p<K);
a memory with a number of K≧(D−1) memory locations identified by said pointer p for temporarily storing data units X (b,j) with $0 < j \leq J-1$ and storing data units Y (b',j') with $0 < j' \leq J'-1$; and a controller coupled to said memory and to said generator, wherein in one loop (j=1 to J-1) in which a base address $0 \leq BA \leq K$ remains constant, said controller is reading data units Y (b',j') of {Y-BLOCK b'} for j=1 to J-1 from locations identified by said pointer p with:

$p = \mod_k (BA + \text{offset}(j))$, said controller is writing data units X (b,j) of {X-BLOCK b} for j=1 to J-1 into the same memory locations identified by said pointer p; and said generator is modulo to base K adding a value 1 or -1 to said base address:

$BA := \mod_K (BA \pm 1)$.

9. The apparatus of claim 8, further receiving data unit X (b,0) and providing Y (b',0) which is not temporarily stored in said memory, so that Y (b',0) is provided with substantially no delay.

10. The apparatus of claim 11, wherein said first sequence {X-STREAM} and said second sequence {Y-STREAM} are representations of the time and index pairs (b j) and (b',j'), and change according to (0,0) (0,1) (0,j) ... (0,J-1) (b,0) (b,1) (b,J) ... (b,J-1) ... (B,0) (B,1) (B,j) ... (B,J*1* 1) and (0,0) (0,1) (0,j') ... (0,J-1) (b',0) (b',1) (b',j') ... (b',J'-1) ... (B,0(B',1) (B',j) ... (B',J'-1), respectively, with progressing time.

11. An apparatus for performing interleaving or de-interleaving which selectively couples one of (J-1) shift lines j (j=1 to J-1) with shifts $\Delta 1$, $\Delta 2$, ... $\Delta j$ ... $\Delta(J-1)$ between an input connection and an output connection, said apparatus comprising:

a memory having a total number of $K \geq \Delta 1 + \Delta 2 + ... + \Delta j + ... \Delta(J-1)$ cells storing data units X;

a generator making one of said cells an activated cell at a time by pointing to one of said cells, said generator knowing $\Delta 1$, $\Delta 2$, ..., $\Delta j$, ..., $\Delta(J-1)$; and a controller coupled to said memory and to said generator, wherein (a) in a first cycle data, in which j is altered from j=1 to J-1, units Y are read from $\Delta j$ distanced activated cells into said output connection, wherein cell distances are calculated using modulo operation;

(b) in a second cycle which follows said first cycle, in which j is again altered from j=1 to J-1, data units X are written from said input connection into $\Delta j$ distanced activated cells; and (c) said first cycle and said second cycle are repeated multiple times.

12. The apparatus of claim 11 wherein said generator points to said cells as calculated by modulo operation to the base K.

13. The apparatus of claim 11 wherein said generator (a) in said first cycle calculates a pointer p going from an initial pointer BA in a first direction;

(b) in said second cycle calculates said pointer p in a second, opposite direction so that at the end of said first and second cycles said pointer returns to its initial value ±an offset, thus guarantying that during said (c) repetition, these data units which need to be stored over multiple cycles are not overwritten.

14. The apparatus of claim 11 which goes into said second-cycle with that cell which has been activated at the end of said first cycle, so that the generator points to the same cell, thus saving calculation time.

15. The apparatus of claim 11 wherein said data units of shift line j are stored in said cells at locations inside said memory which cyclically move inside said memory.

16. The apparatus of claim 11 wherein said shifts $\Delta 1$, $\Delta 2$, ..., $\Delta j$, ..., $\Delta(J-1)$ are programmable.

17. The apparatus of claim 11 wherein said generator is a processor.

18. The apparatus of claim 11 further receiving a first parameter J indicating how many data units X (b,j) at said input line form a block, receiving a second parameter (D-1) indicating a interleaving/de-interleaving depth; and calculating said numbers $\Delta j$ according to $\Delta j \geq j * (D-1)/J$.

* * * * *